(12) United States Patent
Katsumata

(10) Patent No.: US 7,978,254 B2
(45) Date of Patent: *Jul. 12, 2011

(54) IMAGE CAPTURING APPARATUS, ITS CONTROLLING METHOD, AND PROGRAM

(75) Inventor: Momoe Katsumata, Niiza (JP)

(73) Assignee: Canon Kabushiki Kaisha, Tokyo (JP)

( * ) Notice: Subject to any disclaimer, the term of this patent is extended or adjusted under 35 U.S.C. 154(b) by 445 days.

This patent is subject to a terminal disclaimer.

(21) Appl. No.: 12/188,325

(22) Filed: Aug. 8, 2008

(65) Prior Publication Data
US 2009/0051786 A1 Feb. 26, 2009

(30) Foreign Application Priority Data

Aug. 21, 2007 (JP) ................. 2007-215247

(51) Int. Cl.
G03B 13/00 (2006.01)
H04N 5/76 (2006.01)
H04N 5/228 (2006.01)
H04N 5/222 (2006.01)
H04N 5/225 (2006.01)

(52) U.S. Cl. .............. 348/345; 348/231.99; 348/208.99; 348/333.12; 348/169

(58) Field of Classification Search ............. 348/231.99, 348/345, 326, 346, 208.99, 208.12, 208.6, 348/169, 154, 155, 142, 231.3, 333.01, 333.02, 348/333.06, 333.12; 396/80, 82
See application file for complete search history.

(56) References Cited

U.S. PATENT DOCUMENTS
7,256,817 B2 * 8/2007 Yata .............................. 348/143
2001/0002843 A1 * 6/2001 Yata .............................. 348/169

FOREIGN PATENT DOCUMENTS
JP 2000-125178 A 4/2000
JP 2002-044493 A 2/2002
JP 2002044493 A * 2/2002

* cited by examiner

Primary Examiner — Lin Ye
Assistant Examiner — Marly Camargo
(74) Attorney, Agent, or Firm — Cowan, Liebowitz & Latman, P.C.

(57) ABSTRACT

The present invention enables showing main objects position as position of focus measuring point even in case main object has moved after focusing by focus control unit, within the image screen due to framing alternation. It is an image capturing apparatus wherein image sensor conducts photo-electric conversion of object image created by photographing-lens, comprise of distance measuring unit which calculate displacement of aimed object on image sensors imaging screen, due to changes of direction of image capturing apparatus within the time interval, starting from the moment aimed object focused to photographing-lens focus point by focus control unit to the moment actual photo shooting is conducted, and recording unit which records displacement information of aimed object on imaging screen and linked image data.

4 Claims, 11 Drawing Sheets

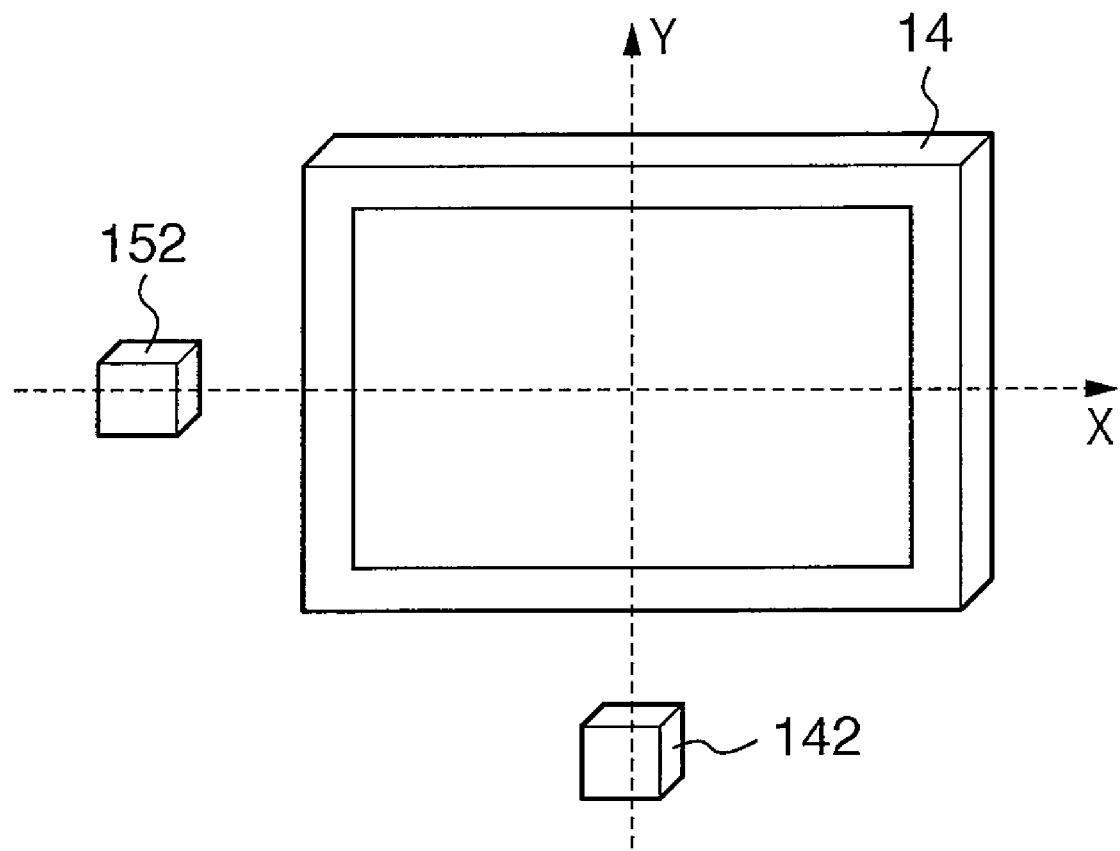

FIG. 11A *(Prior Art)*
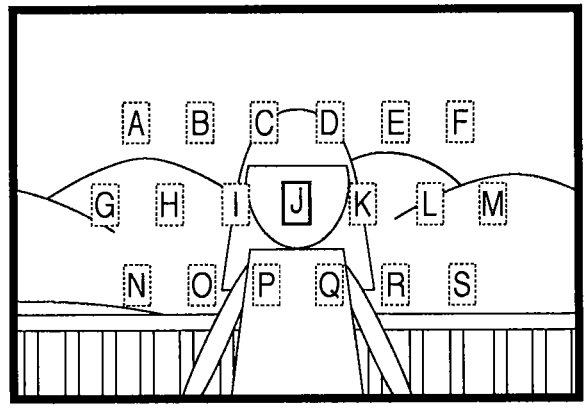
FIG. 11B *(Prior Art)*
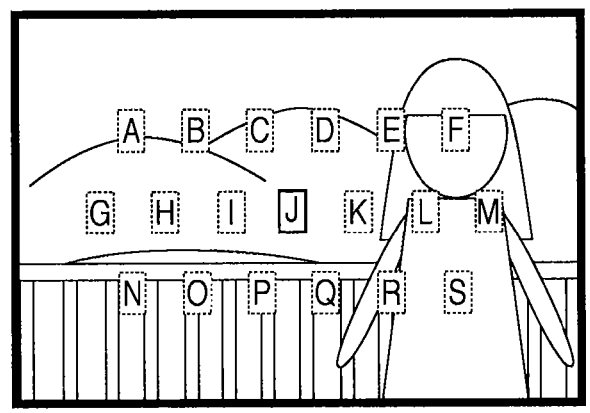
FIG. 11C *(Prior Art)*
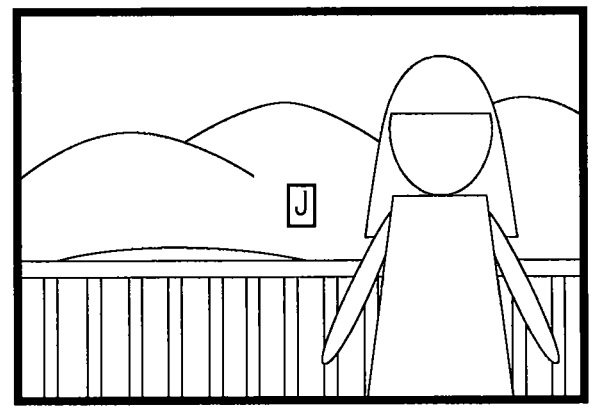

IMAGE CAPTURING APPARATUS, ITS CONTROLLING METHOD, AND PROGRAM

BACKGROUND OF THE INVENTION

1. Field of the Invention

The present invention relates to a technology of recording, position of focus measuring point, with image data, on to the storage medium in such as digital cameras.

2. Description of the Related Art

Many conventional cameras with ability to verify goodness/badness of object image on the spot have been proposed. However, due to space and cost restrictions, display unit such as LCD (liquid crystal display) monitor used in these cameras are limited in size. Thus, it has been quite difficult to verify goodness/badness of the object image using such display units. In addition, even though the sensed image on display unit can be zoomed to evaluate focus condition of the object image, the position of focus measuring point was unknown.

Japanese Patent Laid-Open No: 2000-125178 has proposed a method to solve this problem by displaying superposition of the object image and focus detection point of the image for confirmation before recording it to the storage medium.

Moreover, in Japanese patent laid-open No: 2002-044493 a image capturing apparatus has been proposed, wherein information of focus detection position obtained by focus controlling unit is saved with image data, into storage. And, in Japanese patent laid-open No: 2002-044493 has proposed a way to readout location detection data with image data from storage medium and display location detection data overlapped with image data. In addition, it has made possible to zoom in the neighborhood of focus detecting point.

However in focus-lock shooting procedure, first the main object is focused using focus control unit and then the photo composting is changed by moving the focus point away from the main object while keeping the focus point distance memorized. When focus-lock shooting procedure is used, the composition of photo is changed after focusing. There will be cases where actually focused main object might not recorded as focus measuring point in the conventional technologies given above which used for recording the position of focus detection point with the image data. Here, we explain focus-lock shooting procedure using FIGS. 11A to 11C. In FIGS. 11A to 11C there are 19 focus detecting points, focus control unit can control focus utilizing each focus detection point. Each focus detection point is named from [A]-[S] to make explanation more convenience. Even though focus control unit can control each focus detection point [A]-[S] independently, focus control precision depends on the focus detection point. Thus, focus detection unit with multiple focus detection points might prefer to use the highest precision detection point (As in example: the center focus detection point).

In focus-lock shooting procedure, first the main object, which is the human, is captured with the center focus-detection-point [J] as a temporary composition (FIG. 11A) by adjusting the focus on to the main object and then focus locking, by utilizing the focus control unit. Then, the image capturing apparatus is panned (FIG. 11B) to the desired object. In the new image composition after alteration, initially focused human has moved near to the focus detecting point [F].

Even though the main object is located near distance measurement point F, distance measurement point used by the focus control unit for focusing is J. Thus, the recorded distance measurement point with image data is distance measurement point J, and it has been displayed as the distance measurement point on the image (FIG. 11C). Therefore, when focus condition is checked, the position in which the focus was actually adjusted becomes uncertain. Moreover, a position, which has not been focused after frame alternation, will be zoomed.

SUMMARY OF THE INVENTION

The present invention has been made in consideration of the above-described problem, and has as its object to enabling representation of main-object position focused by focus adjustment unit as the position of focus measuring point, even when main object has been displaced within the photo screen due to framing alternations.

According to the first aspect of the present invention, there is provided an image capturing apparatus having an image sensor which photoelectrically converts an object image formed by photographing lens comprising, a focus control unit configured to adjust a focus of the photographing lens to an aimed object in a field, a position calculation unit configured to calculate a resulting position of an image of the aimed object on an imaging screen when a position of the image of the aimed object moves on the imaging screen in accordance with a change of a direction of the image capturing apparatus between a timing when the focus of the photographing lens is adjusted to the aimed object by the focus control unit and a timing when an actual image capturing operation is performed, and a recording unit configured to record the resulting position of the image of the aimed object on the imaging screen in association with a captured image captured by the actual image capturing operation.

According to the second aspect of the present invention, there is provided a controlling method of an image capturing apparatus having an image sensor which photoelectrically converts an object image formed by photographing lens comprising, a focus control step of adjusting a focus of the photographing lens to an aimed object in a field, a position calculation step of calculating a resulting position of an image of the aimed object on an imaging screen when a position of the image of the aimed object moves on the imaging screen in accordance with a change of a direction of the image capturing apparatus between a timing when the focus of the photographing lens is adjusted to the aimed object by the focus control unit and a timing when an actual image capturing operation is performed, and a recording step of recording the resulting position of the image of the aimed object on the imaging screen in association with a captured image captured by the actual image capturing operation.

Further features of the present invention will become apparent from the following description of exemplary embodiments (with reference to the attached drawings).

BRIEF DESCRIPTION OF THE DRAWINGS

FIG. 3 represents the relationship between image sensor and angular velocity sensor

FIGS. 11A to 11C represents the object image displacement due to focus-lock shooting procedure.

DESCRIPTION OF THE EMBODIMENTS

A preferred embodiment of the present invention will be described below in detail with reference to the accompanying drawings.

First Embodiment

The first embodiment will be explained using FIG. 1 to FIG. 8B.

Figure 1:
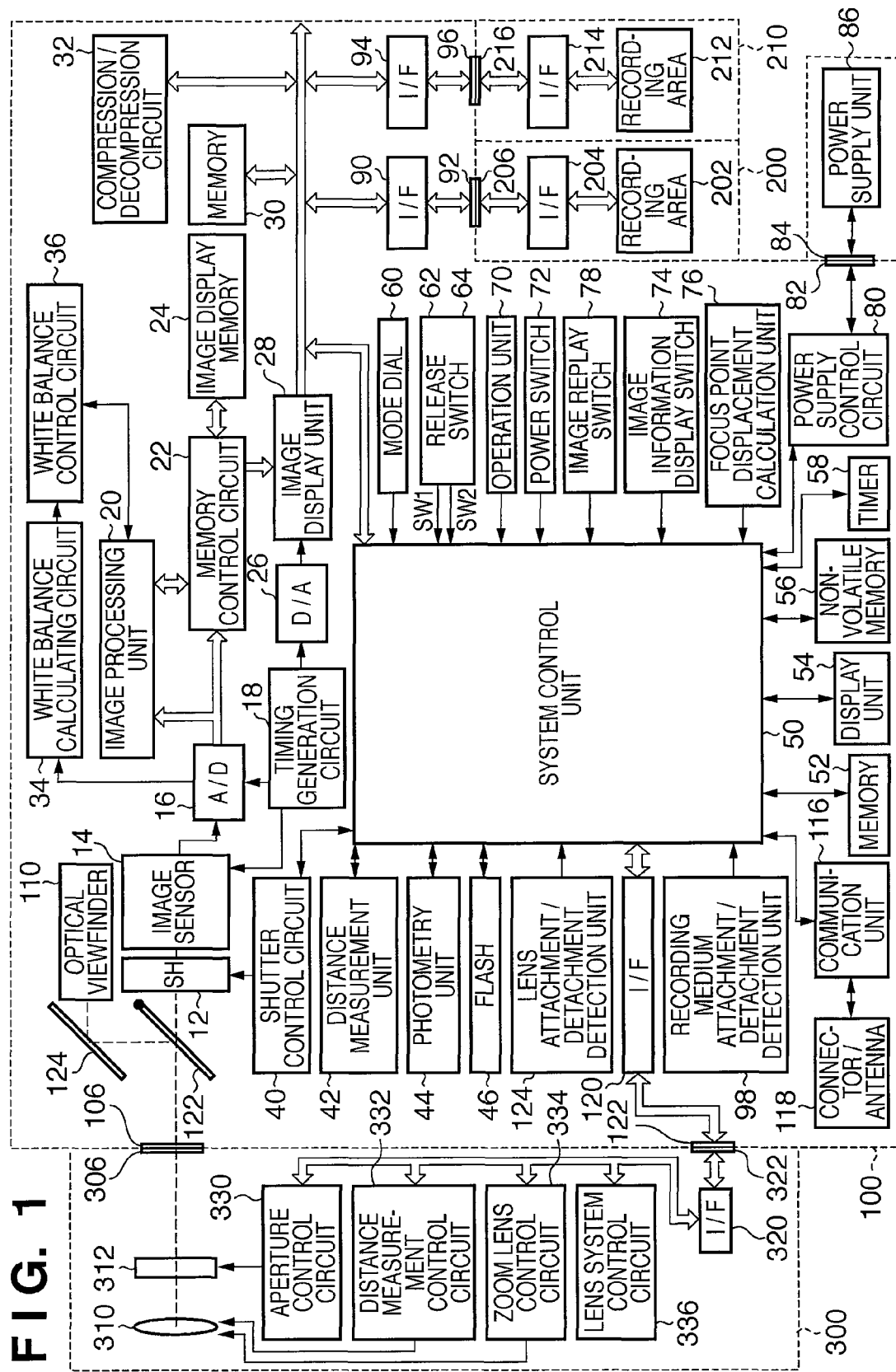
FIG. 1 is a block diagram showing the internal arrangement of a single-lens reflex digital camera as an embodiment of the present invention.

FIG. 1 is a block diagram showing the internal arrangement of a single-lens reflex digital camera common to each embodiment of the present invention.

As represented in FIG. 1, present embodiment of single-lens reflex digital camera comprises with camera body 100, photographing lens unit 300 which includes a photographing optical system comprises with multiple photographing lenses 310 and etc. Also, it comprises with media recording unit 200, 210 and power supply unit 86. The media recording unit 200, 210 and power supply unit 86 is detachable from camera body 100 accordingly.

Photographing lens unit 300 consist of activation unit which activates the photographic lens 310, aperture 312 which controls the light intensity that passes through image lens, and etc. The Photographing lens unit 300 is detachable from the camera body 100 accordingly.

Moreover, camera body comprises as follows.

12 is a shutter, which controls shutter exposure of image sensor 14. 14 is a image sensor which transforms the optical image created by lens 310 in to electrical signal. CCD Sensor, CMOS sensor can be given as examples. The light beam entering into photographic lens 310 passes, light intensity controlling device shutter 312, lens mount 306, 106, mirror 122, shutter 12 to create a optical image on image sensor 14.

The beam incident on optical lens 310 is led to optical viewfinder 110 by mirror 122 and 124. Moreover, quick return mirror or half mirror construction can be used as mirror 122.

16 is a A/D converter, which converts the analog signal received from image sensor 14 into a digital signal.

18 is a timing generator, which provides clock signal and control signal to image sensor 14, A/D converter 16 and D/A converter 26, controlled by memory control circuit 22 and system control circuit 50.

20 is a image processing circuit, which executes predetermined pixel interpolation and color conversation on image data received from A/D converter 16 or else memory control circuit 22. Moreover, when necessity occurs image processing unit 20 can execute predetermined arithmetic processes on image data and control system control circuit 50, distance measurement unit 42 (focus control unit) and photometry unit 44 based on the results of arithmetic process. Namely, AF(auto-focus) process, AE(auto-focus control)process and EF(flash exposure control) process of the TL (through-the-lens) system is conducted. Furthermore, image processing circuit 20 conducts white balancing based on arithmetic process data received from the white balance circuit 36.

Memory control circuit 22 controls A/D converter 16, timing generator 18, image-processing circuit 20, image display memory 24, D/A converter 26, memory 30 and compression/decompression circuit 32. The data output by A/D converter 16 is written to memory 24 or memory 30 via image processing circuit 20 and memory control circuit 22, or only via memory control circuit 22.

Image display memory 24, D/A converter 26, image display unit 28 as a example constructed by such as TFT or LCD, executes the process needed for image display. More specifically, image data recorded in image display memory 24 is sent to the image display unit via D/A converter 26 and displayed on the image display unit 28. When sequentially captured image data using image sensor 14 is successively displayed on the image display unit 28, an electronic viewfinder function can be implemented. Also, when image data is read from recording area 202, 212 of recording media 200, 210, and after predetermined processor conducted by compression/decompression circuit 32, image can be displayed in the display unit 28 via image display memory 24 and D/A converter 26. Recorded image capturing information related to the image data can be displayed on the image display unit 28. Moreover, image display unit 28 can turn on/off the display according to instruction given by system control circuit 50. In case the display is turned off, significant decrease in power consumption of the camera body 100 is possible.

Memory 30 is storage for captured still images and movies, sufficient storage capacity to record predetermined number of still images and predetermined length of movies is provided. Thus, when multiple still images are taken, high speed and high capacity data writing to the memory 30 is possible. Furthermore, memory 30 can be used as a working memory area of system control circuit 50.

32 is a compression/decompression circuit which reads image data stored in memory 30 and compress/decompress image by using techniques such as adaptive discrete cosine transform (ADCT) and then write it to memory 30.

34 is a white balance calculating circuit, which calculates the image sensing field image temperature of the captured image data using TTL method.

White balance control unit 36 calculates white balance correction data, using such as predetermined white balance gain based on users light source selection and color temperature input, which is needed by image controlling circuit 20 to conduct white balancing processors.

40 is a shutter control circuit, which controls the shutter 12 based on the photometric information received from photometry unit 44, while co-operating with aperture control circuit 330 which controls the aperture 312. 42 is a distance measurement unit which used for conducting auto focusing (AF). When light beam entered photographing lenses 310 it enters distance measurement unit 42 via, aperture 312, lens mount 306, 106, mirror 122 and sub mirror used for distance measurement (Not represented in the figure), enabling focus condition evaluation of the formed optical image.

44 is a photometry unit used for conducting auto exposure (AE) processes. When light beam entered photographing lenses 310 it enters photometry unit 44 via, aperture 312, lens mount 306, 106, mirror 122 and lens (not represented in the figure) used for photometry, enabling exposure condition evaluation of the formed optical image.

46 is a flash, with auto focus auxiliary light projection function and flash exposure control function. Based on the calculations by image processing circuit 20 using image data captured by image sensor 14, system control circuit 50 controls shutter control circuit 40, aperture control circuit 330, and distance measurement control circuit 332, also exposure control and auto focus control can be conducted using video Through-the-lens (TTL) metering system. Moreover, auto focus control is allowed to be conducted by using both measuring results received from distance measuring unit 42 and data calculations of image processing circuit 20 based on image data captured from image sensor 14. And, exposure control is allowed to be conducted by using measurement data received from photometry unit 44 and data calculations of image processing circuit 20 based on image data captured from image sensor 14.

50 is a system control circuit of camera body 100. 52 is a memory used for sorting constants, variables, and programs needed for system control circuit 50 operations.

54 is a display unit used for displaying the state or sending messages based on the program running on system control circuit 50 using text, picture and voice. As an example display unit 54 comprise of display function such as liquid crystal display and sound function which generate operational sounds, alarms and etc using such as speaker. Display unit 54 is installed in a place easily recognizable, as a single or a plural installment in the neighborhood of control part on the camera body 100, as an example comprise of a combination of LCD, LED, speaker and etc.

Among the contents displayed on display unit 54, single shot/continuous shooting indication, self timer indication, compression ratio indication, number of recordable pixels indication, number of recorded images indication, number of recordable images indication can be given as contents which can be displayed with LCD and similar display units. The shutter speed indication, aperture value indication, exposure compensation indication, flash level indication, red-eye mitigation, macro shooting indication, buzzer setting indication, clock battery level indication, battery level indication, error messages, information by plurality of digits can also be displayed. Moreover, the attached state of recording medium 200 and 210, attached state of photographing lens unit 300, communication I/F operations, date/time, connection status with external computer can also be displayed.

Among contents displayed on display unit 54, focus level indication, photographing preparation completion indication, hand blurring alarm, flash charge indication and flash charge completion indication can be given as contents shown within optical viewfinder 110.

Moreover, among contents displayed on display unit 54, focus level indication, photographing preparation completion indication, hand blurring alarm, flash charge indication, flash charge completion indication, access to storing medium indicator, macro shooting setting indicator and secondary battery level indicator can be given as contents shown using LED and similar devices.

Among contents displayed on display unit 54 self-timer notification lamp can be given as content shown with a lamp and similar devices. Said self-timer notification lamp can also be used as an auto focus auxiliary light.

56 is an electric deletion/recording capable non-volatile memory, used for recording memory 52 contents according to necessity, as example EEPROM has been used.

58 is a timer which measures elapsed time.

Next, operation means of single-lens reflex digital camera is discussed.

Mode dial 60, release switch SW1 (62) and release switch SW2 (64) are operation means used for providing operation directives to system control circuit 50. The configuration of operation means comprise with single or plurality of combination of switch, dial, touch panel, line of sight detection pointing unit, speech recognition unit, and etc.

Here, detailed discussion of operation means is given.

Mode dial 60 is rotary switch, which allows switching between different shooting modes such as automatic shooting mode, programmed shooting mode, shutter speed priority shooting mode, aperture priority shooting mode, manual shooting mode, depth of focus priority shooting mode, portrait shooting mode, scenery shooting mode, close-up shooting mode, sports shooting mode, night shooting mode, panorama shooting mode.

Release switch SW1 (62) is turned on while release button (not shown in the figure) is operated and stats the operations such as auto focus process, auto exposure process, white balance process, EF (Flash exposure) process, etc. Release switch SW2 (64) is turned on while release button (not shown in the figure) is not operated and stats the following chain operations: sending the signal read from image sensor 14 to A/D converter 16, exposure process written to memory 30 via memory control circuit 22, development processing using calculation data from image processing circuit 20 and memory controlling circuit 22, compression of image data read from memory 30 at the compression/decompression circuit.

70 is operation unit contains various types of buttons and touch panel. As an example comprise of such as menu button, set button, macro button, multi screen reproduction changing page button, flash set button, single/continuous/self-timer set button. Also, comprise of such as menu shift plus button, menu shift minus button, shooting image quality selection button, exposure correction button. Moreover, comprise of such as date/time set button, select/change button, determination/execution button, image display on/off switch, quick review on/off switch, compression mode switch, AF mode set switch.

Select/change button is a button used for selecting or changing the various types of functions used in shooting and playback of panorama, etc. Determination/execution button is a button used for determining or executing various types of functions used in shooting and playback of panorama, etc.

Image display on/off switch is a switch used for setting image display unit 28 on/off where playback is allowed when switch is on.

Quick review on/off switch is a switch used for setting quick review function, which allow playback just after the shooting. Compression mode switch is a switch used for setting the JPEG image compression level or selecting the CCD.RAW mode, which allow storing the output of the image sensor directly as digital image information. AF mode setting switch is a switch that can be used for set starting of auto focus in case of release switch SW1 (62) is on, continue to maintain the focus condition which is called one shot auto focus mode if once focusing is conducted and continue to maintain auto focusing while released switch SW1 (62) is pressed which is called servo AF mode.

Function of said plus button and said minus button comprise with rotary switch allows selection of number values and functions with ease.

72 is a power switch which can turns on the camera body 100 power supply and which can select a plurality of modes when power supply off. Setting the power supply on/off of various attached devices such as photographing lens unit 300 which attached to camera body 100, external flash (Not shown in the figure), recording media 200, 210, can be also conducted together.

74 is a image information display switch. When image information display switch 74 is on information related to displayed image is shown in image display unit 28. 74 is comprise of such as push-button when once pushed push-button turned on and continue to maintain the state, when it pushed again the push-button turned off.

76 is a focus point displacement calculation unit. Focus point displacement calculation unit calculates the focus point displacement within the image screen due to framing alternation etc.

78 is a image replay switch, when turned on image data recorded on recording medium displayed on image display unit 28. The switch is constructed with such as push button, where turns on when pushed once and turns off when pushed again.

80 is a power supply control circuit comprise of such as battery detection circuit, DC-DC converter, powered block switching circuit. It detects battery type, remaining battery power, then DC-DC converter has been controlled based on detection results and according to system control circuit 50 instructions, and then distributed the necessary power voltage to each unit including the recording media. 82 and 84 is a connector, which connect camera body 100 with power supply unit 86. Power supply unit 86 is a power supply unit, which comprise of primary battery such as Alkaline battery, Lithium battery, secondary battery such as NiCd battery, NiMH battery, Li-ion battery, AC adopter, etc.

90 and 94 is interface for recording device such as memory card and hard disk. 98 is a recording medium attachment/detachment detection unit which recognize whether recording media 200 or 210 is mounted to connector 92 or 96.

In the preferred embodiment of the present invention recording medium is described as having two interfaces and connectors construction. Of course, the interface and connectors used for attaching recording medium can be realized with single or plurality of interface/connector construction. Also, it can be realized with combining connectors and interfaces with different standards.

116 is a communication unit, which has various communication functions such as RS232C, USB, IEEE1394, P1284, SCSI, modem, LAN. 118 is connector or a antenna in case of wireless communication, extending from communication unit 116 which connects external devices to camera body 100.

120 is an interface within lens mount 106 which used for connecting camera body into photographing lens unit 300. 124 is a lens attachment/detachment detection unit which detects attachment/detachment of lens mount 106 and connector 122.

Connector 122 is comprised of the function such as control signaling, sate signaling, data signaling and distributing current with plurality of voltage between camera body 100 and lens unit 300. Moreover, connector 122 can be implemented with optical communication, voice communication etc without bounding to electronic communication.

200 is recording medium such as memory card and hard disk. Recording medium 200 is comprised of recording area 202 created form semiconductor memory, magnetic disc etc. interface 204 which interfaces camera body 100, connector 206 which connects to camera body 100. Image data is recorded in recording area 202. Moreover, information of images are recorded as image information data linked with image data.

210 is recording medium such as memory card and hard disk. Recording medium 210 is comprised of recording area 212 created form semiconductor memory, magnetic disc etc. interface 214 which interfaces camera body 100, connector 216 which connects to camera body 100. Image data is recorded in recording area 212. Moreover, information of images are recorded as image information data linked with image data.

Here, photographing lens unit 300 mentioned above is discussed in detail. As mention above photographing lens unit 300 is interchangeable lens type lens unit.

306 is a lens mount which physically mount photographing lens unit 300 to camera body 100. Inside the lens mount 306 various mechanisms that electrically connects photographing lens unit 300 to camera body 100 is included.

320 is an interface within lens mount 306 which used for connecting photographing lens unit 300 to camera body 100. 322 is a connector which electrically connects photographing lens unit 300 to camera body 100. Connector 322 is comprised of communications such as control signal, state signal, data signal, between photographing lens unit 300 and camera body 100 and also distributing current with plurality of voltage between camera body 100 and photographing lens unit 300. Moreover, connector 322 can be implemented with optical communication, voice communication, etc without bounding to electronic communication.

Aperture control circuit 330 controls the shutter 312 based on information from photometry unit 44 while coordinating with shutter control circuit 40 which controls shutter 12. Distance measurement control circuit 332 controls focusing of photographing lens 310. Zoom lens control circuit 334 controls zooming of photographing lens 310. Lens system control circuit 336 controls photographing lens unit 300 as a whole. Lens system control circuit 336 is comprised of memory used for recording operational constants, variables, programs, etc. photographing lens unit 300 is comprised of non-volatile memory used for identifying information such as specific numbers, management information, open aperture value, minimum aperture value, functional information such as focal distance, current and past setting value, etc.

Figure 2:
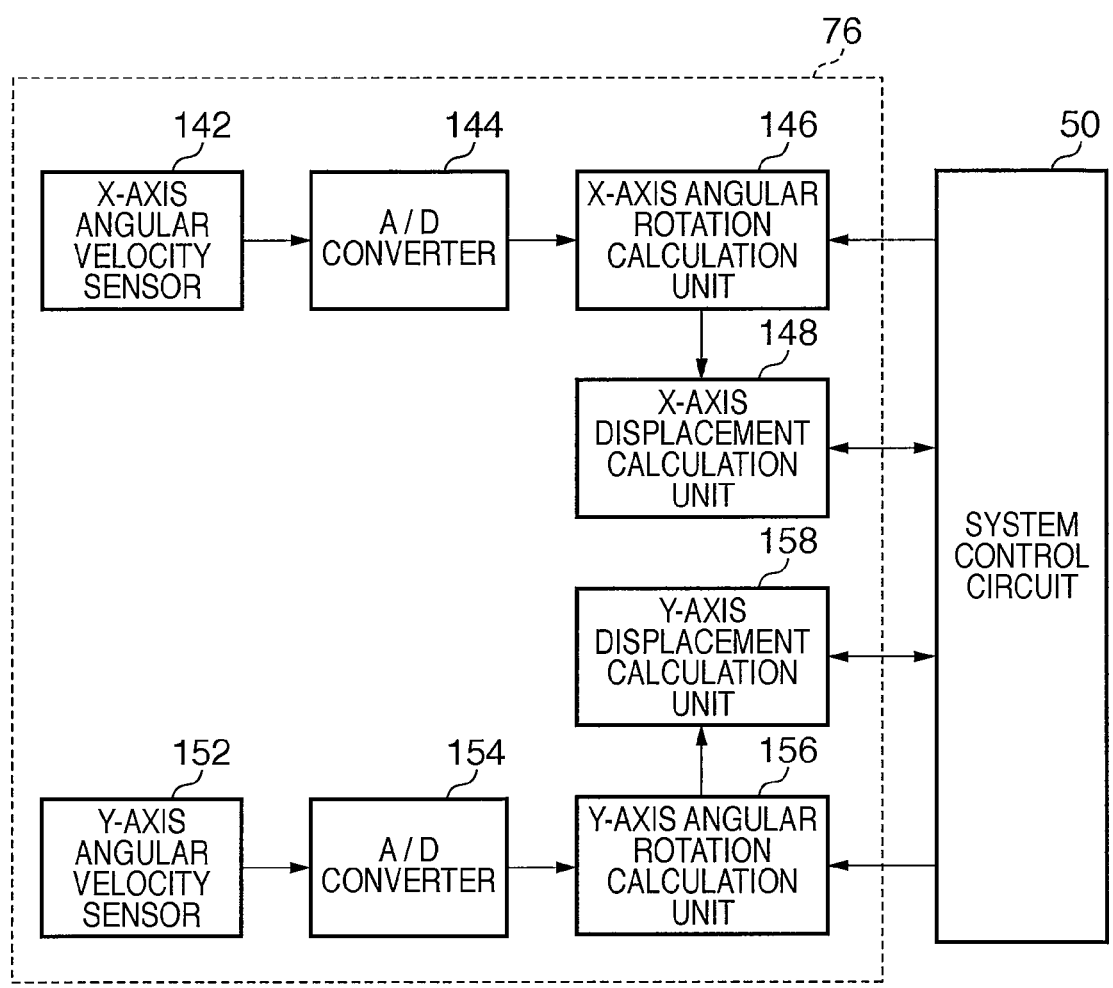
FIG. 2 is a block diagram showing internal arrangements of focus measuring point displacement calculation unit, which calculates the focus measuring point displacement using angular velocity sensors.

FIG. 2 is block figure represents the internal construction of focus point displacement calculation unit 76, which calculates the displacement of focus point within the image screen due to framing alternations etc.

142 is a x-axis angular velocity sensor which uses gyroscope etc. It detects composition changes occur relative to x-axis of camera body 100 as an analog signal of x-axis component of angular velocity change.

144 is an A/D converter, which converts detected analog signal of x-axis angular velocity sensor 142 in to digital signal and output it to x-axis angular rotation calculation unit 146 as X-data.

146 is a x-axis angular rotation calculation unit which calculate angle θx (in degrees) of camera body 100 composition change relative to x-axis based on X-data from A/D converter 144 and integration process based on elapsed time.

148 is a x-axis displacement calculation unit which calculates the imaged object displacement on x-axis direction that starts when release switch SW1 (62) turned ON, and continue until release SW2 (64) turned ON, using rotation angle calculated by x-axis angular rotation calculation unit 146. That is, imaged objects displacement within image screen is calculated based on x-axis rotation angle θx and position of focus measuring point f.

152 is a y-axis angular velocity sensor which uses gyroscope etc. It detects composition changes occur relative to y-axis of camera body 100 as an analog signal of y-axis component of angular velocity change.

154 is an A/D converter, which converts detected analog signal of y-axis angular velocity sensor 152 in to digital signal and output it to y-axis angular rotation calculation unit 156 as Y-data.

156 is a y-axis angular rotation calculation unit which calculate angle θy (in degrees) of camera body 100 composition change relative to y-axis based on Y-data from A/D converter 154 and integration process based on elapsed time.

158 is a y-axis displacement calculation unit which calculates the imaged object displacement on y-axis direction that starts when release switch SW1 (62) turned ON, and continue until release SW2 (64) turned ON, using rotation angle calculated by y-axis angular rotation calculation unit 156. That is, imaged objects displacement within image screen is calculated based on y-axis rotation angle θy and position of focus measuring point f.

FIG. 3 shows the relationship of angular velocity sensor and camera body 100. Optical axis is designated to z-axis, horizontal direction is designated to x-axis, and vertical direction is designated to y-axis of the camera body 100.

As represented on FIG. 3, x-axis angular velocity sensor 142 is positioned on the centerline vertical to image sensor 14 and detects the horizontal (x-axis direction) angular velocity of image sensor 14. The y-axis angular velocity sensor 152 is positioned on the centerline horizontal to image sensor 14 and detects the vertical (y-axis direction) angular velocity of image sensor 14.

Figure 4A:
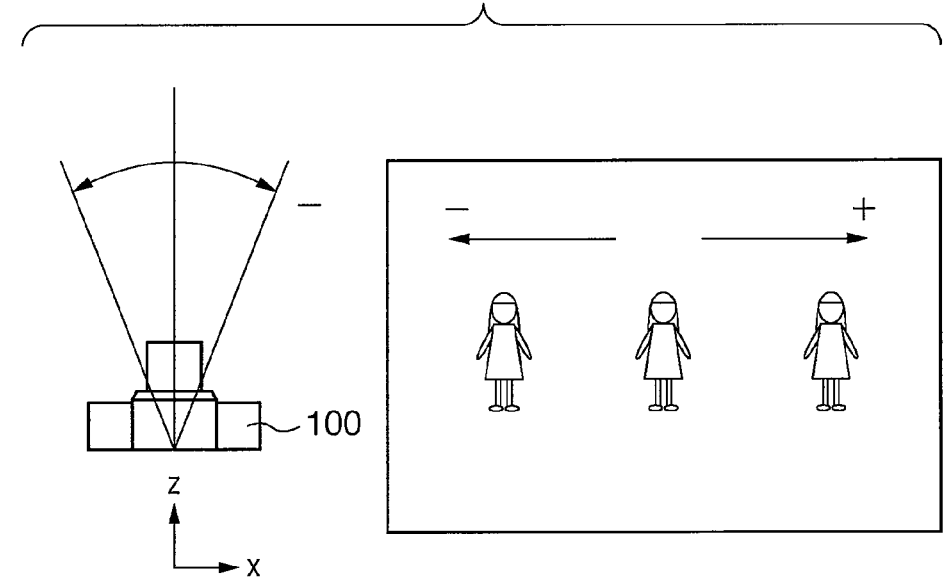
FIGS. 4A, 4B represent the relationship between camera body rotation direction and object-image movement on the image sensor
Figure 4B:
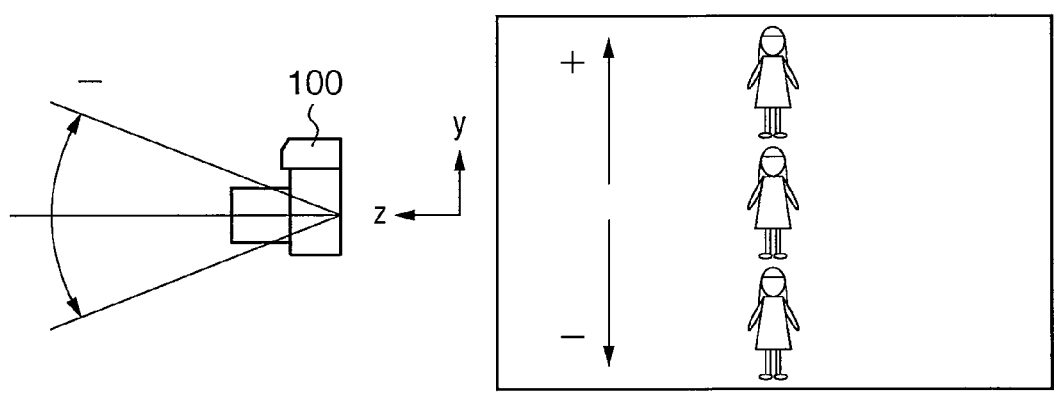

FIGS. 4A and 4B represent the relationship between turning direction of camera body 100 and imaged object displacement on the image sensor.

As shown in FIG. 4A, the camera body 100 is poised horizontally, when it is panned left (+), the imaged object is moved to right (+) on the image sensor 14, and when it is panned right (−), the imaged object is moved to left (−) on the image sensor 14.

As shown in FIG. 4B, the camera body 100 is poised vertically, when it is panned down (+), the imaged object is moved to up (+) on the image sensor 14, and when it is panned up (−), the imaged object is moved to down (−) on the image sensor 14.

When focal distance f of photographing lens unit 300 and the amount of turn (x-axis turning angle θx and y-axis tuning angle θy) of camera body 100 created by framing alternation is known the imaged object displacement on the image sensor 14 can be calculated. We explain the procedures of the calculations using FIGS. 5A and 5B.

Figure 5A:
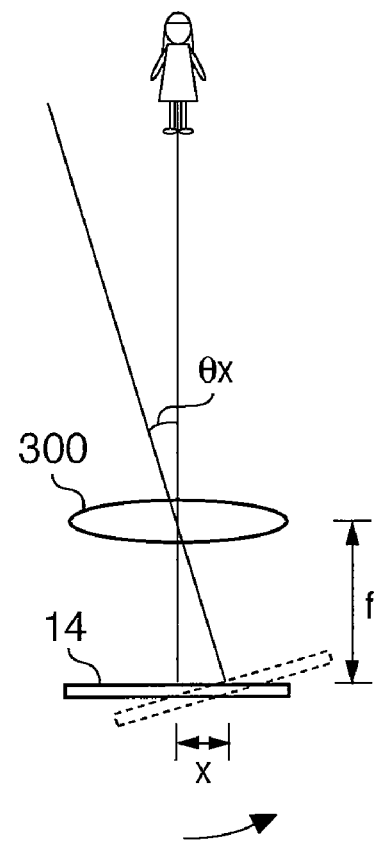
FIGS. 5A, 5B represent the relationship between camera body rotation direction and object-image displacement amount on the image sensor
Figure 5B:
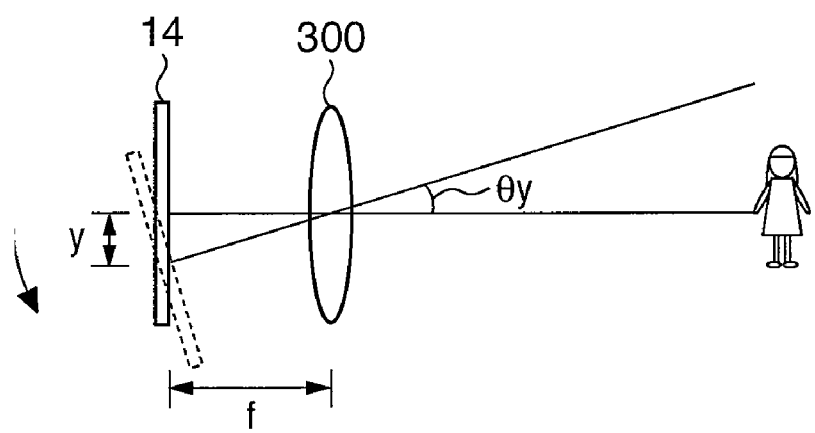

FIGS. 5A and 5B represent relationship between the turning angle of camera body 100 and imaged object displacement on the image sensor 14. FIG. 5A represents panning the camera body 100 to left in θx angle and FIG. 5B represents tilting the camera body down in θy angle. As explained in FIGS. 3, 4A and 4B in reality tuning angle centered on imaging plane is detected but for simplicity, we use the case where lens principle point is turned around the center.

In this case, we can proximate imaged object displacement (x,y) using formula (1). Here, x is displacement in x-axis, y is displacement in y-axis, and f is focal distance.

$$x = f \cdot \tan \theta x$$

$$y = f \cdot \tan \theta y \quad (1)$$

Thus, when camera is turned θx or θy after catching the main object on the mid point of the frame, the main object is displaced to a surrounding area of the frame, this displacement on the image sensor 14 is approximated by the formula (1).

The main object displacement coordinates on the image is calculated by using above displacement measurements (x,y) and focus control information (coordinates used for focus control) by distance measuring unit 42 (focus control unit).

Figure 6:
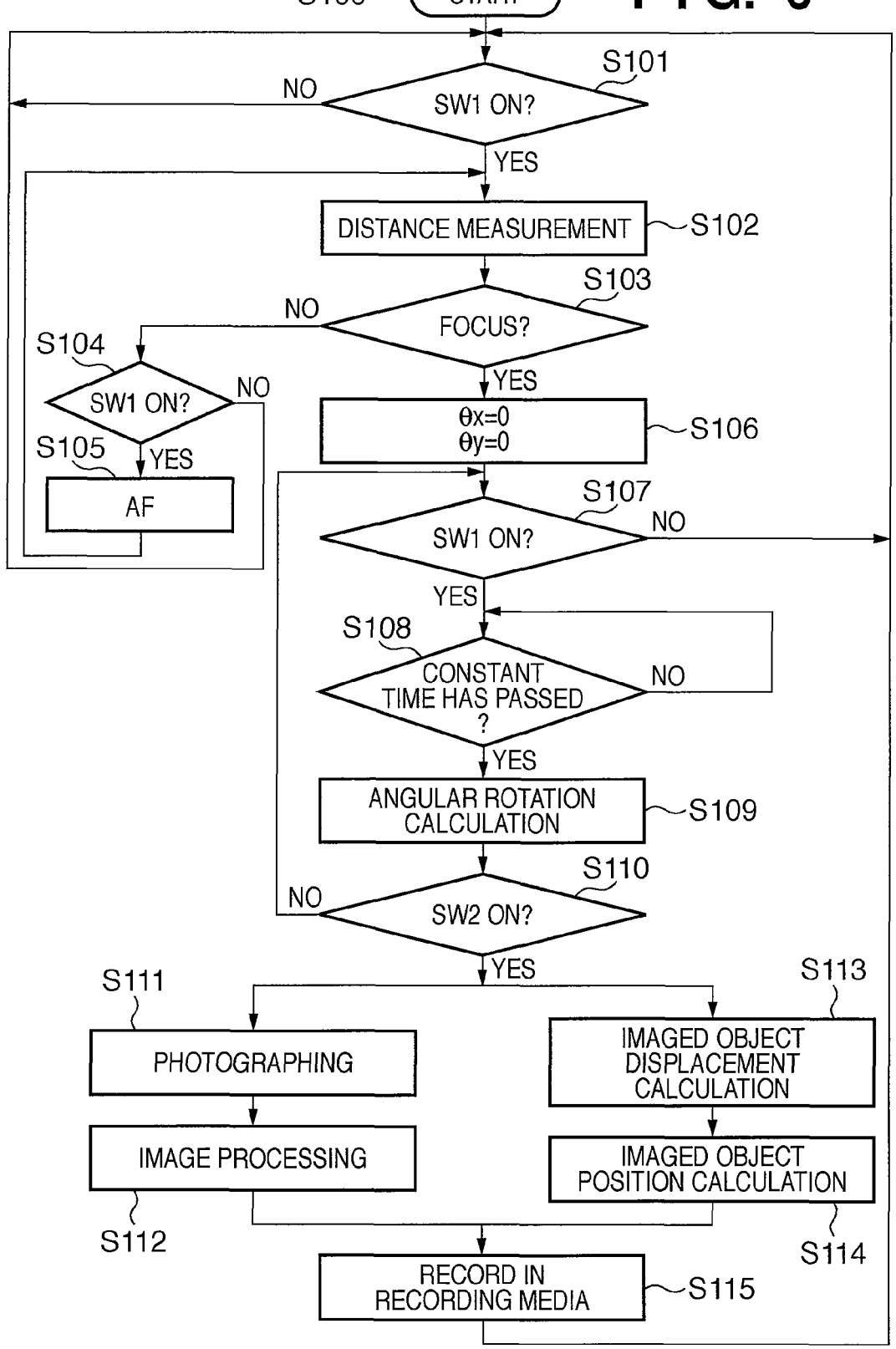
FIG. 6 is a flow chart, which represents focus measuring point displacement calculation procedures due to framing alternation created by camera body rotation

FIG. 6 is an operation flow chart of first embodiment of the present invention which represents flow of calculation of focus measuring point displacement due to framing alternations by camera body 100 turnings and then calculation focus point on the image.

First system control circuit 50 checks the ON/OFF sate of release switch SW1 (62) (Step S101).

When release switch SW1 (62) is not ON (step S101:NO) the checking is repeated until release switch SW1 is ON.

In case relay switch SW1 (62) is ON (Step S101:YES), focus control operations based on phase-difference detection method are conducted by system control circuit 50. Since there are multiple focus controlling points (distance measurement points) such as shown in FIGS. 11A to 11C, methods such as user is allowed to set the distance measurement point and auto-selection of distance measuring point based on neighborhood priority is used. Memory 56 contains the information about which distance measuring point is used and coordinates of distance measuring point. Usually the distance measuring point is overlapped with the aimed imaged object.

First, distance measurement unit 42 calculates the defocus level (Step S102). Focused/Not-Focused is decided by the system control circuit 50 based on defocus level received from distance measuring unit 42 (Step S103).

In step S103 when decided as not-focused (Step S103:NO), checked to see whether release switch SW1 (62) is still ON (step S104), If release switch SW1 (62) is still ON (step S104:YES), based on defocus data from distance measurement unit 42 system control circuit 50 calculate the drive amount of focusing lens. Then based on the drive amount distance control circuit (focusing lens control unit) 332 drives the focusing lens via interface 120, 320 connector 122, 322. This conducts auto focusing operation (step S105), and returns to step S102.

Above, step S102-step S105 is a loop process, it is repeated until focused or release switch SW1 is turned OFF. In case of release switch SW1 (62) turned OFF (step S104:NO), return to step S101.

At step S103, in case focused (step S103: YES), θx of x-axis angular rotation calculation unit 146 and θy of y-axis angular turn calculation unit 156 is set to zero by system control circuit 50 (Step S106). Then, check whether release switch SW1 (62) is ON or not (step S107). When relay switch SW1 (62) is not ON (step S107:NO) return to step S101.

In case release switch SW1 (62) is ON (step S107:YES), check whether constant time has passed after focusing (step S108). In case constant time has not passed wait till the time (step S108:NO). This constant time is used for sensing angular velocity from x-axis angular velocity sensor 142 and y-axis angular velocity sensor 152. When the constant time interval has passed after focusing, output from x-axis angular velocity sensor 142 and y-axis angular velocity sensor 152 is input to D/A converter 144, 154. Then, angle the camera body 100 panned/tilted θx, θy is calculated by x-axis angular rotation calculation unit 146 and y-axis angular turn calculation unit 156 using the X-data and Y-Data which are the output of A/D converter 144, 154 (step S109).

Consequently, system control circuit 50 check whether release switch SW2 (64) is ON or not (step S110). In case release switch SW2 (64) is still not ON (step S110:ON), return to step S107 and repeat step S107 to step S110 loop until SW2 (64) turned ON. Furthermore, at step S109 when this loop process is conducted, calculated angular turn is added sequentially in each constant time interval. The loop that sequentially calculating angular turn allow to tracking the angle camera body 100 panned/tilted until release switch SW2 (64) is turned ON from the time focused.

In step S110, In case release switch SW2 (64) turned ON (step S110:YES), system control unit 50 calculates the exposure time period using the results from photometry unit 44. Based on exposure time period, shutter control circuit 40 controls shutter 12, then image sensor 14 receives light beam through the attached lens unit 300 and conducts the photographing operation, which accumulates signal charge (Step S111). The analog signal receive from image sensor 14 is sent to A/D converter 16 and converted into digital signal. The image processing unit 20 executes processes such as predetermined pixel interpolation and color conversation on the digital signal received from A/D converter 16 (step S112).

On the other hand, system control circuit 50 users focus point displacement calculation unit 76 to calculate focus point displacement on the image due to framing alternation from the time focused and continue until the time SW2 (64) turned ON. Specifically, x-axis displacement calculation unit 148 receives angular turn from x-axis angular rotation calculation unit 146 and then receives focal distance f of photographing lens unit 300 from system control circuit 50. Displacement on x-axis of imaged main object is calculated using Formula 3. y-axis displacement calculation unit 158 receives angular turn from y-axis angular rotation calculation unit 156 and then receives focal distance f of photographing lens unit 300 from system control circuit 50. Displacement on y-axis of imaged main object is calculated using Formula 3 (step S113).

System control circuit 50 calculates the imaged main objects displacement position on the image using the coordinates of distance measurement point selected at step S102 and imaged main objects displacement calculated at step S113 (step S114).

Then, information added to Image data is replaced with distance measuring point closet to position calculated in step S114, and recorded in recording media 200 and 210 (step S115).

Specifically, as an example in FIGS. 11A to 11C imaged main object has focused with [J] distance measuring point, then camera has panned/tilted to create a framing alternation as shown FIG. 11B and captured the image. In this case, displacement from distance measuring point [J] to [F] has been calculated in step S114, thus distance measuring point (focus point) information added to image data is not [J] but the distance measuring point [F] after framing alternation.

Distance measuring point information can be recorded as header information of the image file, which is called EXIF information, or it can be recorded in a separate file as linked information with the image data.

In this embodiment of the present invention is not limited to replacing distance measuring point closest preset distance measuring point(As an example distance measuring points A-S in FIGS. 11A to 11C). As an example imaged main object is focused with center distance measuring point and then imaged main object has moved to a corner in the screen after framing alternation. In such case there might be no preset distance measuring points near the imaged main object. However, it is desirable to add distance measuring point data such that distance measuring point overlap with initially focused imaged object. In such cases the information added to the image data can be the displacement point (pixel coordinate) of the imaged main object as calculated in step S114.

Next, overlapped display operations of image data and position of focus measuring point recorded in recording media is described.

Figure 7:
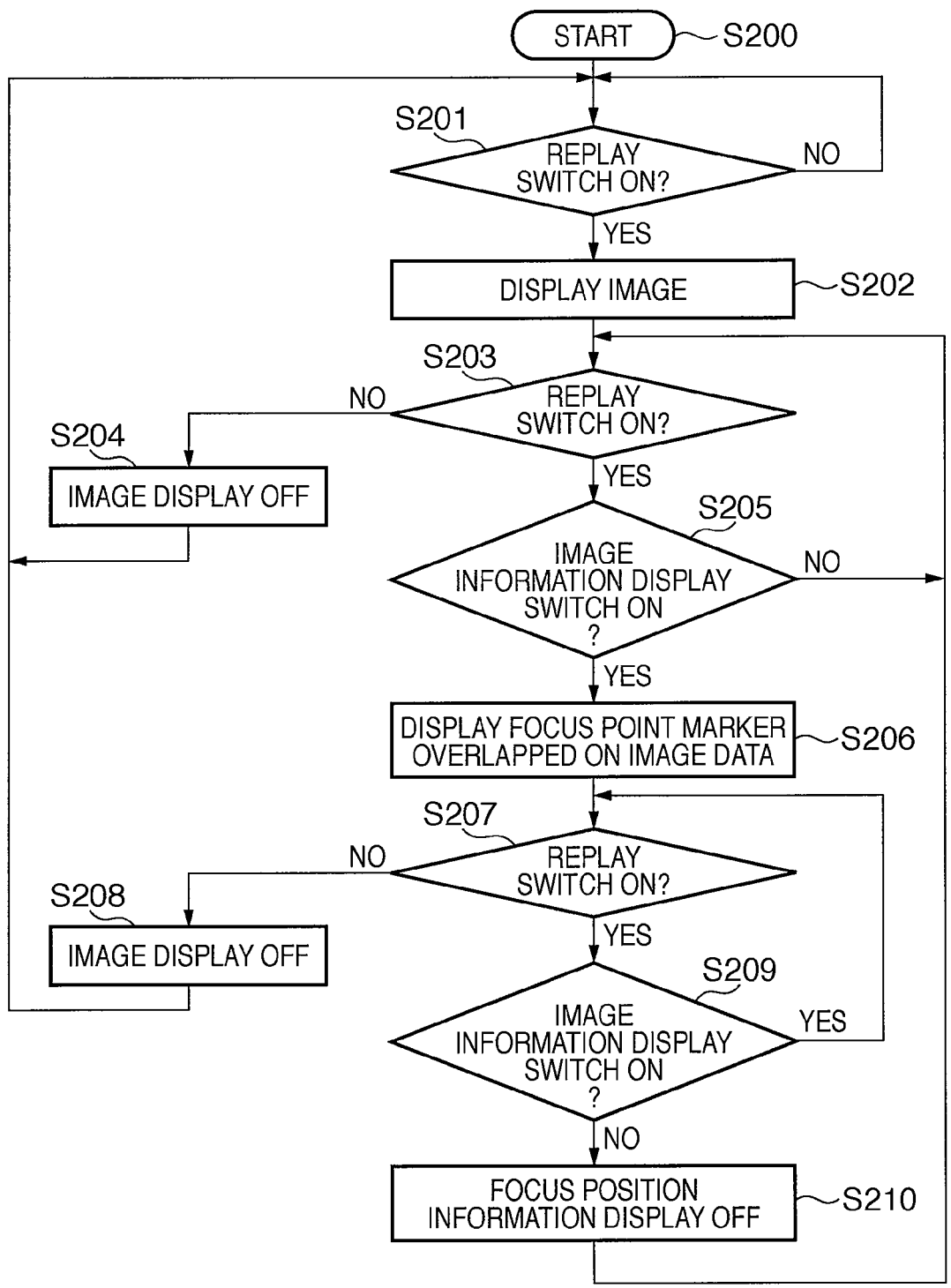
FIG. 7 is a flow chat that represents the superposition of recorded image data on the recording media with position of focus measuring point

FIG. 7 is a flow chart, which represents overlapping, and displaying position of focus measuring point with image data recorded in recording media.

Figure 8B:
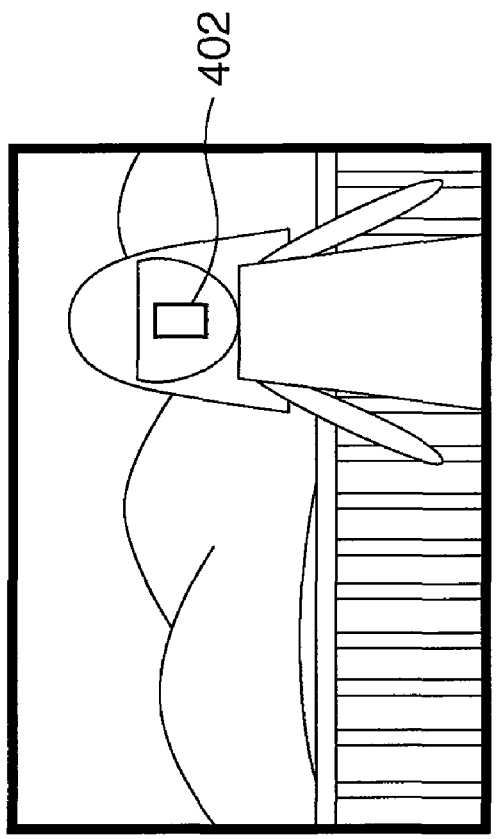
FIGS. 8A, 8B represents the display state diagram when position of the focus measuring point and image data is displayed in the display unit.
Figure 8A:
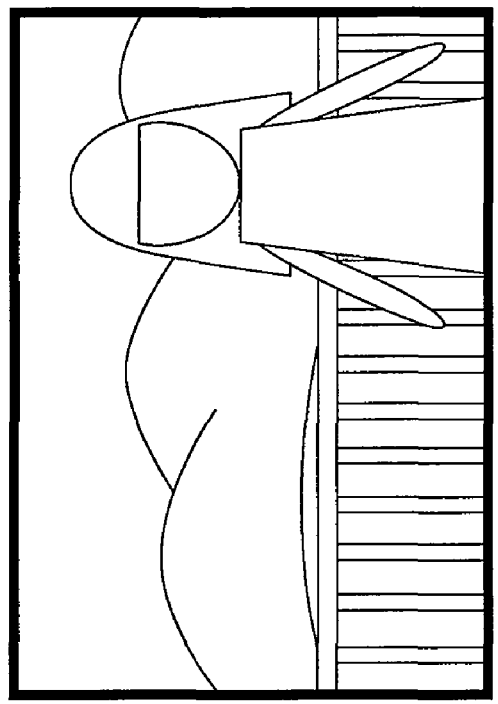

FIGS. 8A and 8B represent display status of image display unit 28 when image data is displayed with overlapped position of focus measuring point.

First, System control circuit 50 checks whether image replay switch 78 is ON or OFF (Step S201). In case image replay switch 78 is OFF (step S201:NO), repeat step S201 until image replay switch 78 is ON.

In step S201, in case image playback switch 78 is ON (Step 201:YES) proceed to step S202. Then system control circuit 50 reads image data recorded in area 202 in recording media 200 to image data compressing/decompressing circuit 32 via connector 92, 206 and interface 90, 204. Compression/decompression circuit 32 conduct data compression suitable for image display unit 28 and system control circuit 50 writes those compressed data into image display memory 24. Then, system control circuit 50 displays the image data recorded on memory 24 on image display unit 28 (FIG. 8A)(Step S202).

Next, System control circuit 50 checks whether image replay switch 78 is continue to be ON (step S203). In case image replay switch 78 is OFF (Step S203:ON) system control circuit 50 turn OFF the image display unit 28 (Step S204) and return to step S201.

In step S203, in case image replay switch 78 continue to be ON (step S203:YES), system control circuit 50 check whether image information display switch 74 is ON or OFF (step S205). Then, in case information switch 74 is OFF (step S205:NO) return to step S203.

In step S205, in case image information display switch 74 is ON (Step S205:YES), proceed to step S206. Then, system control circuit 50 reads focus measuring point position information recorded in area 202 of recording media 200 via connector 92, 206 and interface 90, 204. Moreover, based on position of focus measuring point information a marker which represent focus point (called "focus point marker" in the following discussion) is created. Focus point marker and the imaged data shown in image display unit 28, is overlapped and recorded as new image data in to image display memory 24. Then, displays the overlapped image data recorded in image display memory 24 on image display unit 28 (FIG. 8B). (Step S206).

System control circuit 50 checks whether image replay switch 78 is still ON (step S207). If replay switch 78 is OFF (Step S207:NO), system controls circuit 50 turns the display off in image display unit 28 (step S208) and return to step S201.

In step S207, if the image replay switch 78 is still ON (step S207:YES) proceed to step S209. Then, system control circuit system control circuit 50 check whether image information display switch is 74 is still ON (step S209), in case image information display switch 74 is still ON (step S209:YES), return to step S207.

In step S209, in case image information display switch 74 is turned OFF (step S209:ON), proceed to step S210. Then, system control circuit 50 conducts the following procedures to display only the image data as shown in FIG. 8A. Image data recorded in record area 202 of recording media 200 is input to the compression/decompression circuit 32 via connector 92, 206, interface 90, 204. Then, after data compression suitable for display in display unit 28 is conducted, system control circuit 50 records the results into image display memory 24 and display in display unit 28 (Step S210). Then return to step S203.

As described above, this embodiment of image capturing apparatus calculates the change of angle using angular velocity sensors, occurred due to the panning and tilting of the camera body 100 between focusing to shooting. Using the change of angle the displacement of focus measuring point on image screen can be evaluated. Using these data the original focus point is added to the image information and can be displayed with image data overlapped with the original focus point. Thus, users can easily check the focus level of the image around the point user has originally focused.

In this embodiment angular velocity sensors have been used for angular change calculations, however angular acceleration sensor can also be used. When angular acceleration sensors are used, integration of data once will provide the desired results. Also, if accelerometer is also installed in the camera, in addition to panning/tilting shifting is also detectable by combing with subject distance, allowing highly accurate displacement of focus measuring point detection and display.

Second Embodiment

Figure 9:
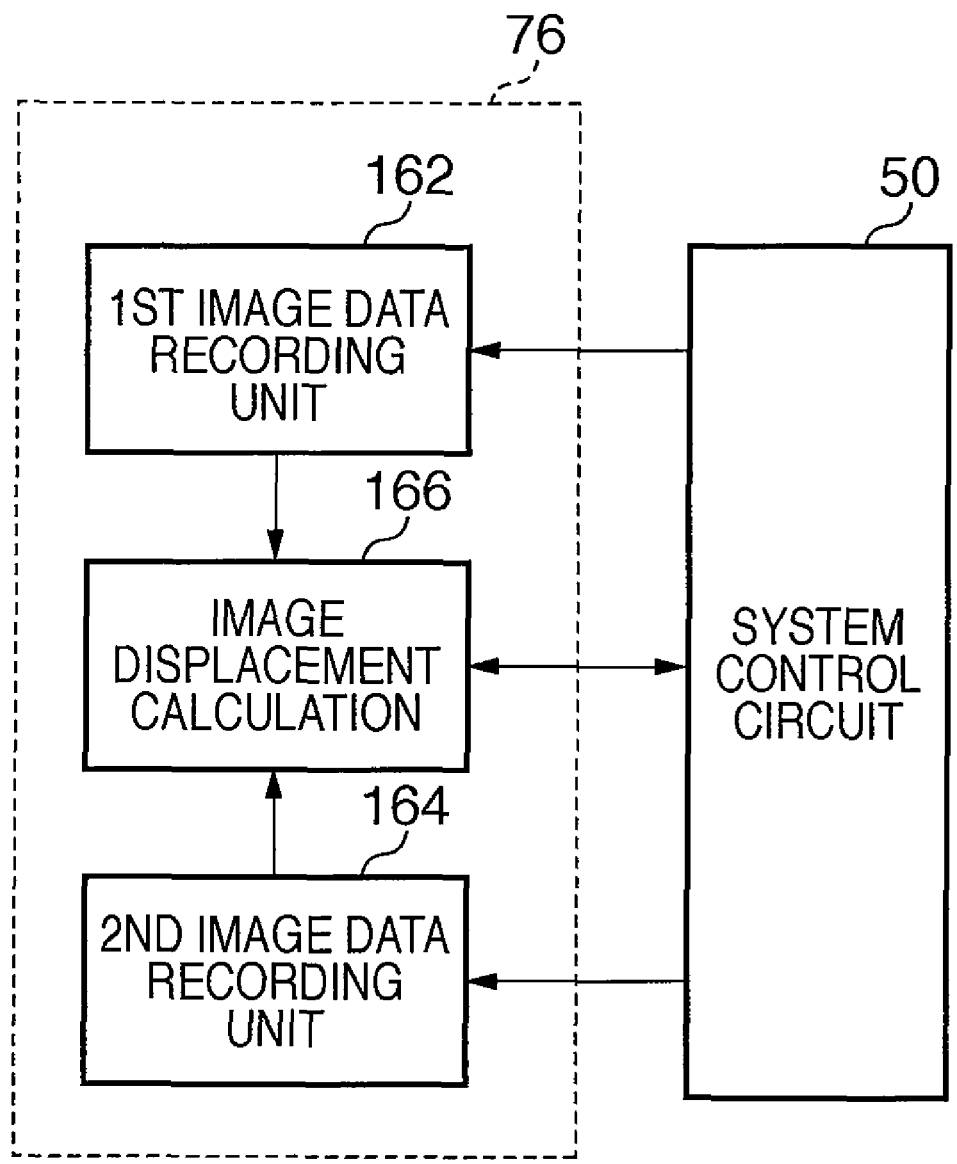
FIG. 9 is a block diagram that represents the internal arrangements of the focus point displacement calculation unit, which calculates focus displacement by comparing focus time image data and capturing time image data
Figure 10:
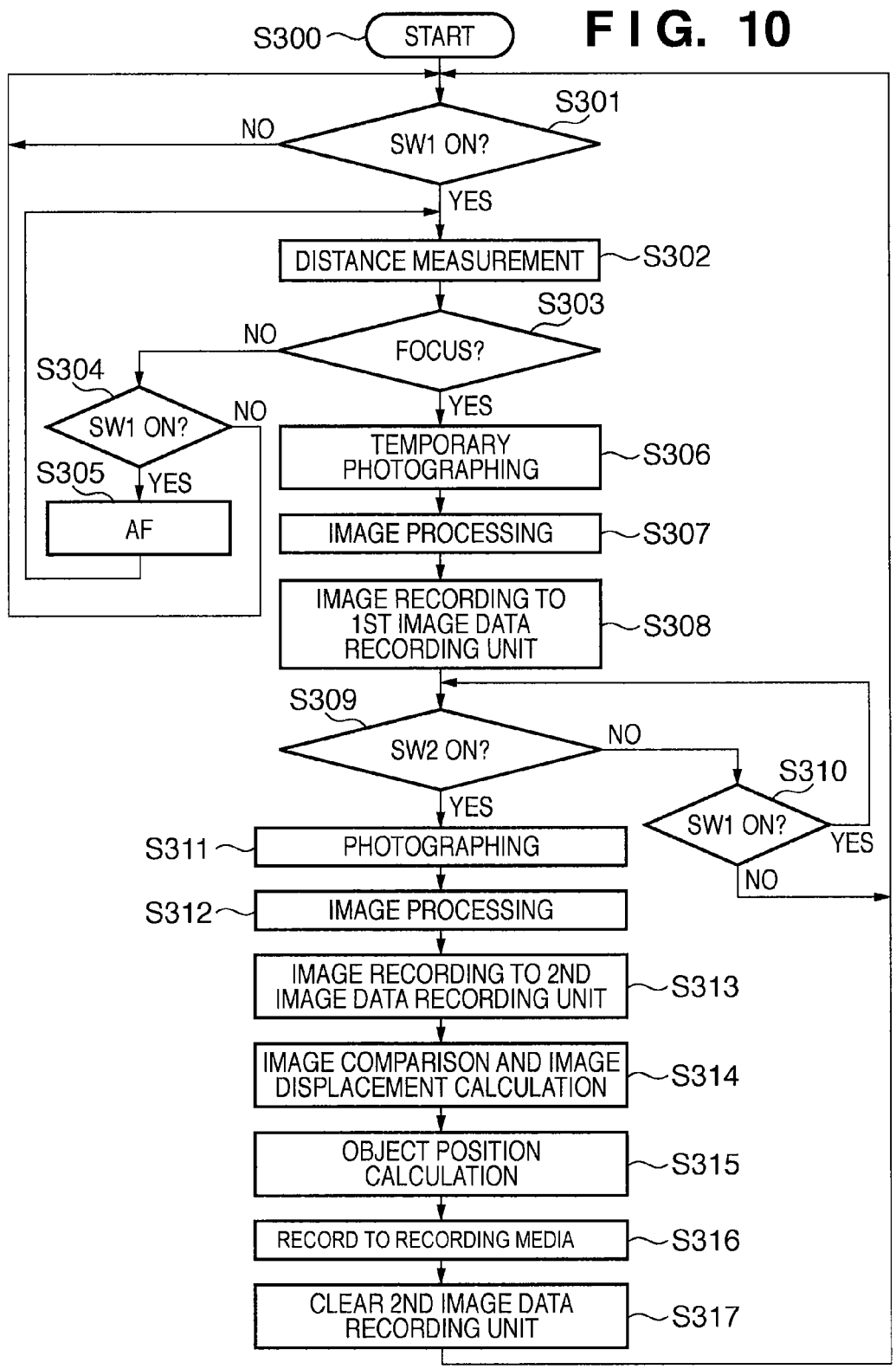
FIG. 10 is a flowchart that represents the work flow of the focus point displacement calculation unit, which calculates focus displacement by comparing focus-time image data and capturing-time image data

Second embodiment is described using FIGS. 1, 9 and 10. In current embodiment single-lens reflex digital camera internal construction is same as the first embodiment.

FIG. 9 is an internal block figure of focus point displacement calculation unit 76 which calculates the focus point displacement by comparing image data when focused and image data when shot.

162 is the first image data recording unit. When release switch SW1 (62) is turned ON, auto focus process is conducted and when focused image data is recorded.

164 is the second image data recording unit. When release switch SW2 (64) is turned ON, shot image data is recorded.

166 is main object displacement calculation unit which calculate the image data displacement using the image data from first image data recording unit 162 and the second image data recording unit 164. Image displacement calculation method such as gradient method and representative point matching exists detailed description are omitted.

FIG. 10 is a process flow chart of second embodiment of image capturing apparatus which represents the flow of process that calculates the focus point displacement by comparing image data when focused and image data when shot.

First, system control circuit 50 checks whether release switch SW1 (62) is ON or OFF (Step S301).

In case release switch SW1 (62) is OFF (Step S301:NO), repeat checking until release switch SW1 is turned ON.

In case release switch SW1 (62) is ON (step S301:YES), system control circuit 50 conducts the focus controlling using phase difference detection method.

Since there is multiple distance measurement points which can be used for focus control such as the multiple points shown in FIGS. 11A-11C, users are allowed to set the distance measurement point or automatically selected based on the closet neighborhood. The information of distance measurement point used in the current focus control process and its coordinate are recorded in memory 56.

First, distance measurement unit 42 calculates the defocus level (step S302). Consequently, system control circuit 50 decides as focused or not focused based on defocus level received from distance measurement unit 42 (step S303).

In step S303, in case decided as not focused (step S303: NO), release switch SW1 (62) is turned ON (Step S304: YES), system control circuit 50 evaluate drive amount of focusing lens base on the defocus level received from distance measurement unit 42.

Then, based on this drive amount, distance control circuit (focusing lens control unit) 332 drives the focusing lens via interface 120, 320 connector 122, 322. This conducts auto focusing operation (step S305), and returns to step S302.

Above, step S302 to step S305 is a loop process, it is repeated until focused or release switch SW1 is turned OFF. In case of release switch SW1 (62) turned OFF (step S304: NO), return to step S301.

In step S303, In case decided as focused (step S303:YES) proceed to step S306. Then, system control unit 50 calculates the exposure time period using the results from photometry unit 44. Based on exposure time period, shutter control circuit 40 controls shutter 12, then image sensor 14 receives light beam through the attached lens unit 300 and conducts the temporary photographing operation, which accumulates signal charge (Step S306). The analog signal receive from image sensor 14 is sent to A/D converter 16 and converted into digital signal. The image processing unit 20 executes processes such as predetermined pixel interpolation and color conversation on the digital signal (from here on called image data A) received from A/D converter 16 (step S307). Then, image data A is recorded into first image recording unit 162 (step S308).

System control circuit 50 check whether release switch SW2 (64) is ON or OFF (step S309).In case release switch SW2 (64) is OFF (step S309:NO), check whether release switch SW1 (62) is still ON (step S310). If release switch SW1 (62) is ON (step S310:YES) return to step S309. If release switch SW1 (62) is OFF (step S310:NO) return to step S301.

In step S309, In case release switch SW2 (64) turned ON (step S309:YES ),system control unit 50 calculates the exposure time period using the results from photometry unit 44. Based on exposure time period, shutter control circuit 40 controls shutter 12, then image sensor 14 receives light beam through the attached lens unit 300 and conducts the consecutive photographing operation, which accumulates signal charge (Step S311). The analog signal receive from image sensor 14 is sent to A/D converter 16 and converted into digital signal. The image processing unit 20 executes processes such as predetermined pixel interpolation and color conversation on the digital signal (from here on called image data B) received from A/D converter 16 (step S312). Then, image data B is recorded into second image recording unit 164 (step S313).

Next, main object displacement calculation unit 166 calculates the main object displacement due to framing alternations by comparing image data A recorded in first image recording unit 162 and image data B recorded in second image recording unit 164 (step S314). Here, when calculating main object displacement using phase difference detection method in step S302, the object within closest proximity to selected distance measuring point, which used for focus control is considered as the main object.

System control circuit 50 calculates the position of main object, using coordinates of distance measuring point selected for focus control in step S302 and calculated main object displacement (step S315). Then, calculated position data at step 315 is added to image data and recorded in recording media 200 and record media 210 (step S316).

Then delete the image data A and image data B recorded in first recording unit 162 and second recording unit 164 (step S317), then return to step S301.

As explained above, in current embodiment of image capturing apparatus, image data used for focus controlling and image data used for shooting is being compared to calculate focus point displacement. Then using focus point displacement and distance calculation point coordinate the focus point on the image has been calculated. Since the position of focus point has added to image data which has recorded focus point displacement due to farming alternation of the camera, position of focused point image capturing apparatus has used can be shown to the user.

Adding position of focus point to image data, overlapped display operations of image data with position of focus measuring point can be conducted the same way as in embodiment 1. This, detailed discussion is omitted.

Variant Example of Said Embodiment

Above first and second embodiment, is not limited to phase difference method based focus control, which is used in the discussion. As an example generally known contrast AF can be also used as the focus control method.

Continual imaged object acquisition is not limited to compact digital camera, as an example even in single lens reflex digital camera 122 it could be achieved by removing mirror 122 from light axis and by sequential driving image sensor 14 while keeping the shutter 12 open. Displaying the images acquired consecutively on image display unit 28, an electronic viewfinder can be implemented. Then, main object can be focused by checking the contrast of continual image data.

In cameras using contrast AF (Compact digital camera/single lens reflex digital camera), as an example a situation where focus control is conducted in the center of the image, and then change framing while locking the focus is considered. In case the camera has an angular velocity sensor, focus point information recording and image data display can be conducted as in first embodiment. Also in case it conducts image comparison as in second embodiment, image data used for contrast AF or image data used for electronic viewing can be used as the temporary-shooting image.

Also, in above first and second embodiment, the image display unit 28 of camera displays, focus information linked with the image with the image. However, when image data is moved to a PC as long as image data contains the additional focus information, suitable software can display focus information in a suitable way.

Other embodiment

Also, objective of each embodiment can be achieved by following method. Namely, providing system or unit recording media with software program code which implement previously mentioned functions of the embodiment. Then, the computer (CPU or MPU) of system or unit reads to code in the recording media and execute the code. In this case, the code read from the storing media itself implements the functions of embodiment discussed before, and the storage device storing the program forms the current invention. When computer execute the program the invention does not limited to implementing the functions discussed above, it includes the cases such as. According to the program code part or whole function can be executed by the operating system, which is running on the computer, and it can implement part of whole functionality of the embodiment.

Moreover, case such as following is also included in current invention. Namely, program code read from the storing device is recorded into memory unit attached to the computer such as extended card or extended memory unit connected to the computer. After that, CPU within extended card or extended memory unit will execute part/or whole function according to the program and implement the functionality of said embodiment.

When present invention is applied to said recording unit, program which contains previously explained procedures is reordered in the recording unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-215247, filed Aug. 21, 2007, which is hereby incorporated by reference herein in its entirety.

What is claimed is:

1. An image capturing apparatus having an image sensor which photoelectrically converts an object image formed by photographing lens comprising:
    a focus control unit for adjusting a focus of the photographing lens to an aimed object in a field;
    a first image storage unit for storing an image captured at the timing when the focus of the photographing lens is adjusted to the aimed object and a second image storage unit for storing an image captured by the actual image capturing operation;
    a position calculation unit for calculating a resulting position of an image of the aimed object on an imaging screen when a position of the image of the aimed object moves on the imaging screen in accordance with a change of a direction of said image capturing apparatus between a timing when the focus of the photographing lens is adjusted to the aimed object by said focus control unit and a timing when an actual image capturing operation is performed, wherein said position calculation unit calculates the resulting position of the image of the aimed object on the imaging screen by comparing the image stored in said first storage unit and the image stored in said second storage unit;
    a recording unit for recording the resulting position of the image of the aimed object on the imaging screen in association with a captured image captured by the actual image capturing operation; and
    a display unit for displaying an image indicating the resulting position of the image of the aimed object by superimposing on the captured image.

2. The image capturing apparatus according to claim 1, further comprising a rotation angle calculation unit configured to calculate a rotation angle of said image capturing apparatus relatively to the aimed object, wherein said position calculation unit calculates the resulting position of the image of the aimed object using the rotation angle calculated by said rotation angle calculation unit.

3. A controlling method of an image capturing apparatus having an image sensor which photoelectrically converts an object image formed by photographing lens comprising:
    a focus control step of adjusting a focus of the photographing lens to an aimed object in a field;
    a first storing step of storing in a first image storage unit an image captured at the timing when the focus of the photographing lens is adjusted to the aimed object and a second storing step of storing in a second image storage unit an image captured by the actual image capturing operation;

a position calculation step of calculating a resulting position of an image of the aimed object on an imaging screen when a position of the image of the aimed object moves on the imaging screen in accordance with a change of a direction of said image capturing apparatus between a timing when the focus of the photographing lens is adjusted to the aimed object by said focus control unit and a timing when an actual image capturing operation is performed, wherein said position calculation step calculates the resulting position of the image of the aimed object on the imaging screen by comparing the image stored in said first storage unit and the image stored in said second storage unit;

a recording step of recording the resulting position of the image of the aimed object on the imaging screen in association with a captured image captured by the actual image capturing operation; and a display step of displaying an image indicating the resulting position of the image of the aimed object by superimposing on the captured image.

4. A program recorded on a non-transitory computer-readable recording medium which implements the css of claim 3 in a computer.

* * * * *